United States Patent
Ferguson et al.

(10) Patent No.: US 7,130,397 B2
(45) Date of Patent: Oct. 31, 2006

(54) APPARATUS, AND AN ASSOCIATED METHOD, FOR DETECTING A MASS CALL EVENT AND FOR AMELIORATING THE EFFECTS THEREOF

(75) Inventors: Thomas Lynn Ferguson, Carrollton, TX (US); Maureen Rose O'Toole, Plano, TX (US)

(73) Assignee: Alcatel, Paris (FR)

( * ) Notice: Subject to any disclaimer, the term of this patent is extended or adjusted under 35 U.S.C. 154(b) by 229 days.

(21) Appl. No.: 10/623,240

(22) Filed: Jul. 18, 2003

(65) Prior Publication Data

US 2004/0022366 A1 Feb. 5, 2004

Related U.S. Application Data

(60) Provisional application No. 60/401,094, filed on Aug. 5, 2002.

(51) Int. Cl.
*H04M 15/00* (2006.01)
*H04M 7/00* (2006.01)

(52) U.S. Cl. .............................. 379/112.04; 379/112.1; 379/133; 379/221.03

(58) Field of Classification Search ........... 379/112.01, 379/114.01, 115.01, 133–134, 32.01–32.03, 379/219, 221.03, 221.05, 221.06, 221.07, 379/221.1, 112.03–112.1
See application file for complete search history.

(56) References Cited

U.S. PATENT DOCUMENTS

| | | | | |
|---|---|---|---|---|
| 5,592,530 A | * | 1/1997 | Brockman et al. | 379/32.03 |
| 5,828,729 A | * | 10/1998 | Clermont et al. | 379/32.01 |
| 5,923,742 A | * | 7/1999 | Kodialam et al. | 379/133 |
| 5,974,126 A | * | 10/1999 | Hollas et al. | 379/137 |
| 6,243,449 B1 | * | 6/2001 | Margulis et al. | 379/112.04 |
| 6,327,350 B1 | * | 12/2001 | Spangler et al. | 379/115.01 |

* cited by examiner

*Primary Examiner*—Quoc Tran
(74) *Attorney, Agent, or Firm*—Ttom Gellenthien; Craig A. Hoersten; V. Lawrence Sewell

(57) ABSTRACT

Apparatus, and an associated method, for detecting and facilitating amelioration of mass call event in a telephonic network. A detector monitors call attempts to form call connections during operation of the telephonic network. When more than a selected level of call attempts are made to a particular one, or more than one, called station within a selected period, a mass call event is considered to have occurred and detection thereof is made. A notifier initiates notification of other network elements in the telephonic network, and the rate at which call connections are permitted with the called stations is limited during the duration of the mass call event.

21 Claims, 2 Drawing Sheets

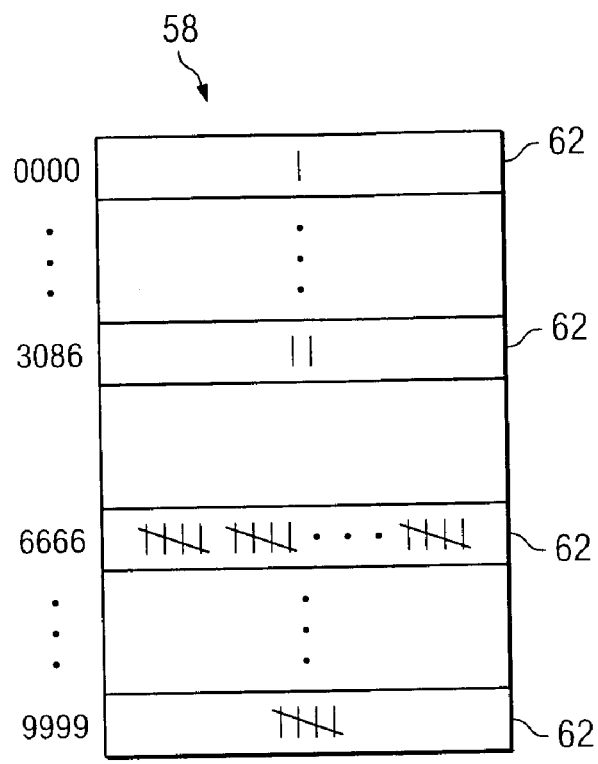
FIG. 3
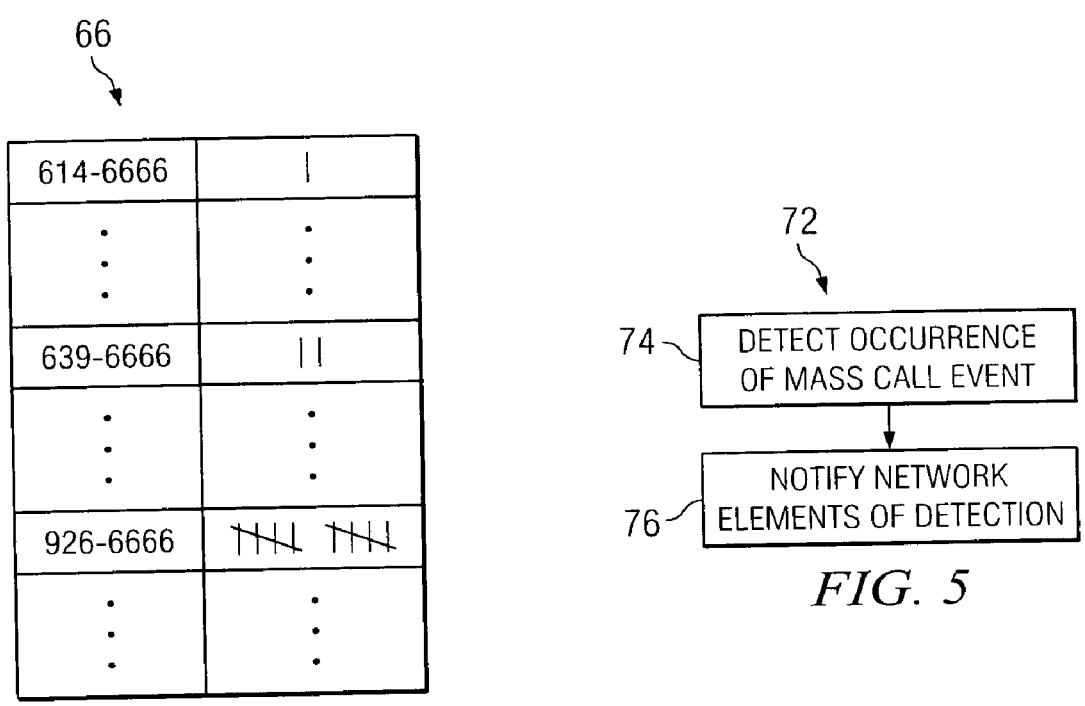
FIG. 4
FIG. 5

APPARATUS, AND AN ASSOCIATED METHOD, FOR DETECTING A MASS CALL EVENT AND FOR AMELIORATING THE EFFECTS THEREOF

CROSS-REFERENCE TO RELATED APPLICATIONS

The present application claims the priority of provisional patent application No. 60/401,094, filed on Aug. 5, 2002.

The present invention relates generally to a manner by which to facilitate detection of a mass call event in a telephonic network. More particularly, the present invention relates to apparatus, and an associated method, by which automatically to detect the occurrence of the mass call event and, once detected, to permit network operation automatically to be altered, automatically to ameliorate network congestion caused by the mass call event.

Automatic detection of the mass call event and automatic implementation of steps to ameliorate congestion conditions caused by the mass call event permits quicker resolution of the problems associated with the mass call event than when relying on manual intervention to detect and ameliorate the problem. Statistical computations are used to derive parameters that facilitate the detection of the mass call event, permitting reduced amounts of data gathering and processing in the detection process. And, amelioration of the mass call event is carried out in a systematic manner, permitting a selected call rate of calls to be connected while the mass call event continues.

BACKGROUND OF THE INVENTION

Use of telephonic networks through which to communicate is an endemic part of modern society. Telephonic communications are effectuated pursuant to many types of communication services as well as, perhaps most pervasively, to effectuate voice communication services. Public-access telephonic networks are widely deployed and are regularly through which to effectuate the telephonic communications.

The telephonic networks that encompass various geographical areas are interconnected. And, when suitably interconnected, telephonic communications are effectuable between telephonic stations connected to, and forming part of, almost any of the telephonic networks that are interconnected there together. Thereby, telephonic communication services are effectuated between locations at which access to a telephonic network is available.

A telephonic network comprises a communications fabric that includes, e.g., a signaling network and switching entities. Telephonic stations forming calling stations are connected to the switch entities, and telephonic stations forming called stations are also coupled to switch entities. The switch entities perform switching functions and are operable, together with operation of the signaling network to form call connections between calling and called stations. When a call connection is formed, telephonic communication between the calling and called stations is permitted.

When telephonic communications are to be effectuated between a calling and a called station, dialed digits associated with the called station are entered at the calling station, such as by user actuation of a telephonic keypad in some telephonic networks. An IAM message, for instance, is formed as part of a call set-up procedure. The IAM message includes values of the dialed digits associated with the called station. Additional signaling is generated as call set-up procedures are carried out, pursuant to conventional operation of the telephonic network. A call request is routed to the called station, and the call is accepted at the called station. The call connection is formed and the telephonic communications commence. When the communication session during which the telephonic communications are effectuated is completed, the communication session is terminated, by sending a release message through the signaling network, and the call connection is terminated.

While the number of concurrent call connections that are capable of formation in the telephonic network is, usually, large, the number of concurrent call connections that can be formed is not infinite. That is to say, the telephonic network is of a finite capacity. And, the telephonic network is constructed to be of a selected size, i.e., to permit a selected level, or capacity of concurrent call connections to be formed. When the capacity of the network is exceeded, call attempts, i.e., attempts to form call connections, fail.

A careful balance between competing goals of increasing the size of the telephonic network and minimizing the costs of the telephonic network is made when selecting the size, i.e., the capacity, of the network. While maximizing the size of the telephonic network minimizes the possibility of the occurrence of call connection attempts that exceed the capacity of the telephonic network, the costs associated with a telephonic network of such capacity would be prohibitively expensive.

Telephonic networks are correspondingly more regularly constructed to be of capacities that permit all of the call connections that are normally requested within a selected standard deviation. That is to say, telephonic networks are typically constructed to be of capacities that permit all of the call connections, within a selected standard deviation, or other normative value, to be completed. When concurrent call connections are attempted in excess of this number, not all of the call connections can be formed. Call connection failure results for at least some of the call connection attempts.

A significant increase in call connection attempts to a called station or a set of called stations is sometimes defined as being a mass call event. During a mass call event, the number of call connection attempts might approach, or exceed, the capacity of the telephonic network. The influx of the call connection attempts causes network congestion that might prevent the completion of revenue-generating calls, thus adversely affecting the profitability of the network.

Mass call events are sometimes caused by generalized mass media initiated calls, such as request for responses to polls, voting, drawings, and fund raisers. These occurrences are generally characterized by a large number of call connection attempts to a specific station within a short time period. And, the call connection attempts are not controlled at the destination, i.e., the called station, or stations, location.

Conventional efforts to reduce the deleterious effects of a mass call event require an operator of the telephonic network both to manually detect the mass call event and then to intervene manually. The time period required both to detect and to intervene manually is sometimes lengthy, necessitating excessive amounts of time in which to ameliorate the effects of the mass call event.

If a manner could be provided by which better to more quickly detect the occurrence of a mass call event, and to ameliorate the effects of the mass call event, improved telephonic network performance would be provided.

It is in light of this background information related to telephonic networks that the significant improvements of the present invention have evolved.

SUMMARY OF THE INVENTION

The present invention, accordingly, advantageously provides an apparatus, and an associated method, by which to facilitate detection of a mass call event in a telephonic network.

Through operation of an embodiment of the present invention, a manner is provided by which automatically to detect the occurrence of the mass call event. And, once the mass call event is detected, network operation automatically is altered, automatically to ameliorate network congestion caused by the mass call event. Because the mass call event is automatically detected, and steps to ameliorate congestion conditions are automatically implemented, quicker resolution of the problems associated with the mass call event is provided in contrast to conventional reliance upon manual intervention to detect and to ameliorate the congestion conditions.

Derived parameters are formed based upon statistical computations to facilitate the detection of the mass call event, thereby to provide for detection of the mass call event responsive to the collection of reduced amounts of data and processing thereof. And, a systematic manner is carried out to ameliorate the mass call event to permit connection of calls at a selected call rate. The mass call event is ameliorated in a controlled manner by permitting call connections to be formed at a controlled rate with called stations associated with the mass call event for so long as the mass call event continues.

In one aspect of the present invention, a mass call event detector is embodied in a signaling network and operates to detect occurrence of a mass call event. The mass call event detector is positioned to receive indications of attempts by calling stations to form call connections with called stations. The indications are IAM messages generated pursuant to conventional call set-up procedures. When detection is made of a mass call event, the detector generates indications of the detection that are provided to network elements that, upon their detection, are used to ameliorate the call congestion caused by the mass call event.

The mass call event detector is embodied, for example, at an application processor of a STP (signaling transfer point). IAM messages are forwarded to the signaling transfer point by switch elements that are connected to calling stations that initiate call requests. A mass call event is a network-operator-defined level of calls placed to a particular calling station, or calling stations, within a selected time period. A match criteria, a value related to the operator-selected threshold value, is used by the mass event detector by which to detect the occurrence of a mass call event.

The mass event detector, in one implementation, utilizes a two-tier detection procedure. During first tier detection procedures, the detector monitors all IAM messages that are generated pursuant to call set-up procedures by monitoring portions, such as the final four digits of telephonic identifiers of the called stations identified in the IAM messages. Monitoring continues for a selected sampling period derived. Any called station identified in IAM messages that meet the match criteria forms a "suspect" mass-call-event called station. Continued monitoring is performed of the number, or numbers, of the suspect called stations. The second period forms a second tier monitoring period. If, during this second tier monitoring period, the telephonic identifier identifying the called station, or stations, is again detected in the IAM messages in excess of the match criteria, the associated called station is determined to be a party to a mass call event.

When the mass call event is detected by the mass call event detector, the number of call connections that are permitted to be completed between calling stations and the offending called station is limited to a selected number of call connections within a selected time period. That is to say, the rate at which call connections are permitted to be made to the of ending called station is limited, thereby to control the number of call connections that are made during any period, measured during the duration of the mass call event. When the mass call event is no longer detected, the limitation on the call connections that are permitted to be formed is removed. Normal telephonic network operation thereafter again commences.

Thereby, automatic detection, and steps to ameliorate the effects of, a mass call event are carried out without the need for human intervention. Delays associated with conventional need to manually intervene in some manner in the detection or to take steps to ameliorate the problems associated with the mass call event are obviated.

In these and other aspects, therefore, apparatus, and an associated method, is provided for a telecommunications network. The telecommunications network has network elements, and call connections are formed between calling stations and called stations to permit telephonic communications to be effectuated. Amelioration of network congestion caused by a mass call event is facilitated. A mass call event occurs when a plurality of call connections are requested to be made to a selected set of called stations within a selected time period. A mass call event detector is adapted automatically to receive indications of selected attempts to form call connections between selected calling stations and selected called stations during operation of the telecommunications network. The mass call event detector detects occurrence of the mass call event responsive to the indications of the selected attempts. A notifier is coupled to the mass call event detector to receive indications of detection of occurrence of the mass call event. The notifier notifies the network elements of the mass call event, automatically and free of network interaction. In the exemplary implementation, the STP does not notify other network elements of the event; rather the STP releases the calls to offending number at the rate specified by the user.

A more complete appreciation of the present invention and the scope thereof can be obtained from the accompanying drawings that are briefly summarized below, the following detailed description of the presently preferred embodiments of the invention, and the appended claims.

BRIEF DESCRIPTION OF THE DRAWINGS

FIG. 3 illustrates a representation of an exemplary array formed during operation of an embodiment of the present invention and used in a preliminary detection of a mass call event.

FIG. 4 illustrates an exemplary representation, similar to that shown in FIG. 3, but of an array that is formed during operation of an embodiment of the present invention to detect the occurrence of a mass call event.

FIG. 5 illustrates a method flow diagram listing the method steps of the method of operation of an embodiment of the present invention.

DETAILED DESCRIPTION

Figure 1:
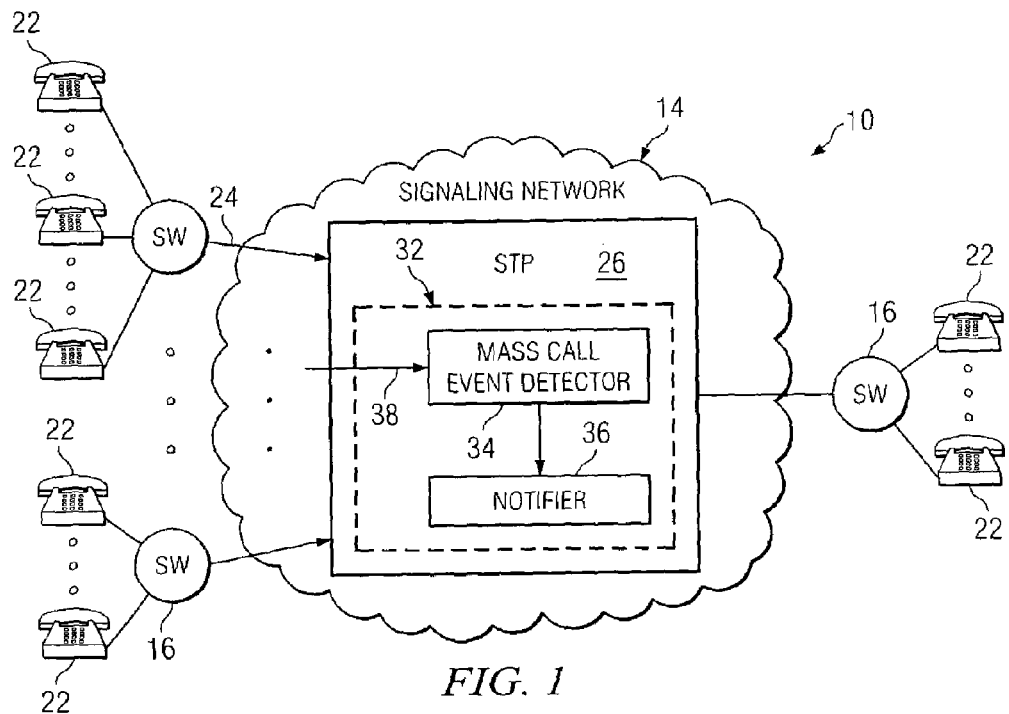
FIG. 1 illustrates a functional block diagram of a telephonic network that includes an embodiment of the present invention as a portion thereof.

Referring first to FIG. 1, a telephonic network, shown generally at 10, operates to provide for communications between communication stations, here telephonic stations that are connected to, or otherwise operable in, the telephonic network. The telephonic network is representative of any various types of telephonic networks that provide for telephonic communications. That is to say, the telephonic network 10 is representative of any of various, conventional telephonic networks that operate to form call connections between telephonic stations forming stations and telephonic stations forming called stations. Upon formation of call connections between the calling and called stations, telephonic communications are permitted. Communication of both voice and non-voice data is permitted between the calling and called stations.

The elements forming the network 10 are functionally represented and, in an actual implementation form either, or both, logical and physical entities. The telephonic network also includes additional elements and entities, not separately shown, for purposes of simplicity. It should be understood, of course, that, in an actual implementation, additional entities and elements form portions of the telephonic network.

The telephonic network includes a signaling network 14 to which a plurality of switch elements 16 are connected. The switch elements are, in turn, coupled to telephonic stations 22.

Any of the telephonic stations 22 can initiate a call to another telephonic station. And, any of the telephonic stations can receive a call initiated by another of the telephonic stations. A telephonic station that initiates a call to another telephonic station is sometimes referred to as a calling station, or an originating station. And, a telephonic station with which another telephonic station initiates a call is referred to as a called station or terminating station. Such terminology shall be used herein.

When a call is initiated, call set-up procedures commence. An IAM message, for instance, is generated by a switch element that is coupled to a calling station. The IAM message is here generated on a line 24. The IAM message includes values of the dialing digits, that is, the telephone number, of a called station to which the call connection is requested.

The signaling network includes one or more signaling transfer points (STPs), of which a single transfer point 26 is shown in the Figure. The signaling transfer point is coupled to the switches 16. During operation, the signaling transfer point operates as a switching center that provides for the transfer from one signaling link to another. When the telephonic network forms a common-channel signaling network, the call that is associated with the signaling is routed through the signaling transfer point. And, when the telephonic network forms a non-associated, common channel signaling network, the signal transfer point need not be the point through which a call, which is associated with the signaling being switched, passes. The telephonic network is representative of either a common-channel signaling network or a non-associated, common-channel signaling network and the signaling transfer point is correspondingly representative of a STP operable in either of such types of networks.

The telephonic network is constructed to be of a selected capacity, that is, of switching and processing capacity to permit a selected activity level. The capacity of the telephonic network is determinative of the number of concurrent call connections that can be made during its operation.

While the telephonic network is typically sized to be of a capacity corresponding to typical, anticipated usage thereof, the network typically is not sized to be of a capacity permitting every telephonic station therein concurrently to be involved in a communication session in which a call connection is formed by every one of the telephonic stations. In typical usage, only a fraction of the telephonic stations connected to the telephonic network are involved in a call that requires a communication connection to be formed. However, in the event of a surge of call attempts, the capacity of the telephonic network to form the requested call connections is exceeded. As noted previously, the occurrence of a mass call event in which a surge of call attempts in a short time period are made results in call congestion conditions that prevent the completion of the desired call connections at the rate at which the call connections are requested.

The signal transfer point 26 includes apparatus 32 of an embodiment of the present invention. The apparatus 32 operates to detect and to facilitate amelioration of the call congestion, in a controlled manner, caused by the mass call event. The apparatus 32 is also functionally represented, formed of functional entities. The functional entities forming the apparatus are implementable in any desired manner, such as by algorithms executable by processing circuitry. And, while the entities forming the signaling transfer point are represented to be embodied at the signal transfer point 26, the functions performed by the entities of the apparatus can also be distributed amongst more than one signaling transfer point, or embodied at other elements, other than a signaling transfer point.

The apparatus includes a mass call event detector 34 and a notifier 36. The mass call event detector operates to detect the occurrence of a mass call event and to provide indications of the detection to the notifier. The notifier operates, responsive thereto, to notify structure of the telephonic network of the mass call event condition, thereby to facilitate amelioration of the congestion conditions in a controlled manner to alleviate the congestion conditions. Operations performed by the detector and the notifier are performed automatically, free of manual intervention. Thereby, the detection is able to be made quickly, and amelioration of the effects correspondingly is able to be made quickly, without the need to await manual intervention to detect and correct for the mass call event.

A network operator-generated input, here represented on the line 38, is used to help to define the mass call event. More particularly, the input value provided by the network operator is a value forming a threshold value that is used in the determination of the occurrence of a mass call event. Through appropriate selection of the threshold value, the network operator is able to control the number of call connection requests that precipitate the indication by the mass call event detector of a mass call event.

Figure 2:
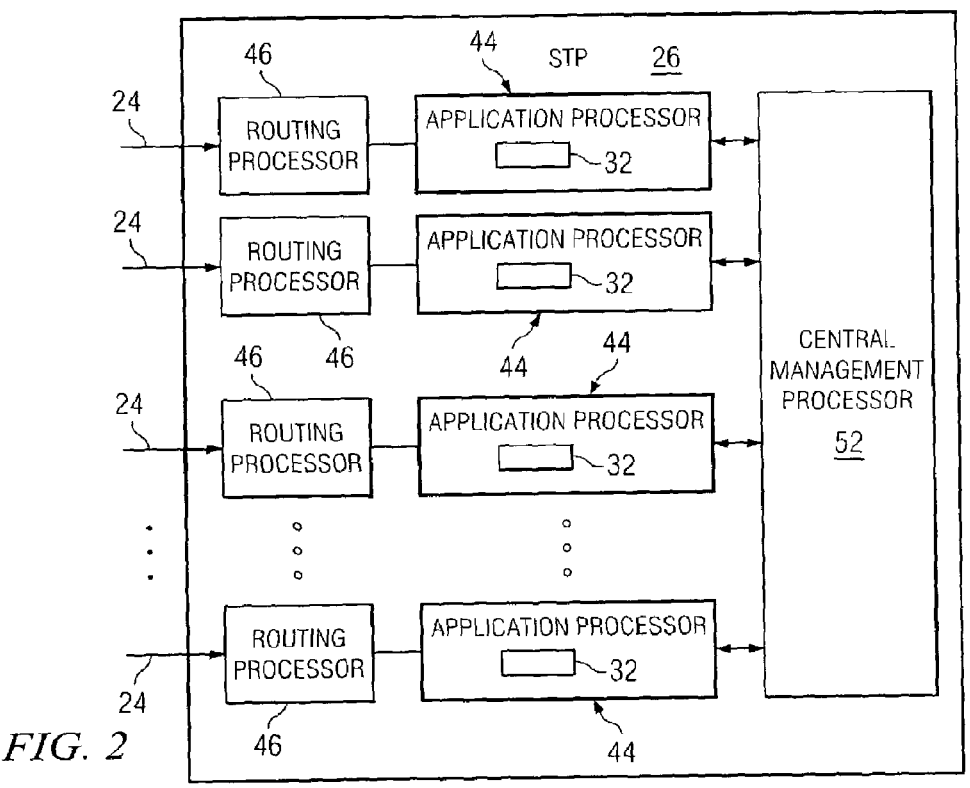
FIG. 2 illustrates a functional block diagram of a signaling transfer point (STP) that forms a portion of the telephonic network shown in FIG. 1 and that is operable pursuant to an embodiment of the present invention.

FIG. 2 illustrates the signal transfer point 26 that forms part of the telephonic network 10 shown in FIG. 1. The signal transfer point, in the exemplary implementation, includes a plurality of application processors 44 and a plurality of routing processors 46. The application processors are processors on which the mass call event application of an embodiment of the present invention are running, or available upon which to run. Each processor 44 'sees' a representative sample of all of the traffic passing through the STP. The routing processors, in the exemplary implementation, correspond in number with the number of the application processors. The routing processors are coupled to receive the IAM messages routed to the signal transfer point on the lines 24. And, the routing processors 46, upon detection of the IAM messages, perform routing functions to route the call requests associated with the IAM messages. And, the signal transfer point also includes a central management processor 52. The central management processor forms the processor that performs the central management of the mass call event notification. In an exemplary implementation, the application processors form DSS processors, and the central management processor forms a CCM processor.

One of the application processors 44 is designated as a processor that operates pursuant to an embodiment of the present invention, that is, to include the apparatus 32 as a portion thereof or otherwise to perform the functions carried out by the apparatus. The application processor that is selected, or otherwise nominated, to perform the detection and notification operations is provided with indications of IAM messages provided thereto. And, because the nominated application processor receives a fractional part of the IAM messages provided to the signal transfer point, detections made by the nominated application processor are representative, in a fractional manner, of the total number of IAM messages delivered to the signal transfer point.

The IAM messages each include values identifying the called station, as well as the calling station that initiates a call to the called station. The nominated application processor analyzes the values, i.e., the values of the dialing digits of the received IAM messages pursuant to the mass call event detection. When a mass call event is detected, the notifier forms a notification message that is provided to a central management processor 52. The central management processor, responsive thereto, alerts the other application processors of the mass call event detection. The other application processors, as well as the nominated application processor, in turn, limit the number of call connections that are permitted during any period, thereby to limit the congestion that otherwise would occur as a result of uncontrolled call connection during a mass call event. And, as a selected number of call connections are permitted by each of the application processors, some call attempts result in successful call connections. The limitation on the number of call connections to a called station that is identified pursuant to the mass call event detection continues for the duration of the mass call event. Thereby, congestion conditions of the mass call event are ameliorated.

Various parameters are utilized in the operation of the apparatus embodied at the nominated application processor. A threshold rate is one of such parameters. The threshold rate is the rate of calls per second to a specific telephone number, i.e., called station that is considered a mass call event. And, action is another of such parameters. The action is the rate of calls per second to the suspect telephone, i.e., the called station to pass through the signal transfer point during the mass call event after which the calls will be returned with a provisionable release cause. And, a match criteria is the threshold rate, divided by the number of application processors, then multiplied by a sampling period.

With, potentially, thousands of messages per second flowing through the routing and the application processors, statistical computations are used to derive additional parameters. The parameters are noted below:

| # AP | Matches | Sample Period | Real Rate | Probability | Annual Events | 80% Rate | Messages | Delta |
|---|---|---|---|---|---|---|---|---|
| 1 | 60 | 2.0 | 30 | 2.1E–114 | 0.00 | 24 | 48.00 | 12.00 |
| 2 | 30 | 2.0 | 30 | 4.99E–49 | 0.00 | 24 | 24.00 | 6.00 |
| 3 | 20 | 2.0 | 30 | 9.98E–30 | 0.00 | 24 | 16.00 | 4.00 |
| 4 | 15 | 2.0 | 30 | 7.86E–21 | 0.00 | 24 | 12.00 | 3.00 |

The amelioration of the call congestion caused by the mass call event functions as an extension of a triggerless call type blocking feature. When this feature is active, all IAM messages are routed to the application processors for query processing.

In the exemplary implementation, the application processor that is utilized to detect the mass call event is selected by the central management processor during system initialization. The apparatus, in another implementation, is embodied at more than one, or all, of the application processors and the central management processor selects which of the application processors is to be nominated.

Also in the exemplary implementation, mass call event detection is made as a two-tier process. During the first stage, that is, the first tier, of the detection process, a 10,000 byte array, illustrated in FIG. 3, shown generally at 58, is formed. The array is formed of the possible values of the final four digits of the telephone number of the called party, contained in each of the IAM messages. Peg counts, indicated in each row 62 of the array, are maintained. And, a count of the detected values of each, or any, of the 10,000 possible values of the final four digits of the called station telephone number is maintained during a sample period. The match criteria, defined to be the threshold value divided by the number of application processors, multiplied by a sample period defines a value that, if a count value is in excess of such value, a telephone number is considered to be a 'suspect' called station. Here the digits '6666' meet the match criteria and identify a suspect called station.

During a next subsequent sample period, a second-stage, that is, the second tier procedure commences in the event that a suspect called station is identified. Otherwise, the second tier procedure does not commence. A second array, shown generally in Figure at 66, is formed during the second stage detection procedure. During this stage, each telephone number that met the match criteria in the first stage detection procedure is now a suspect number. That is, here, any telephone number having the final four digits of '6666.' During this stage two procedure, the nominated application processor continues to monitor IAM messages and to compare each one to the list of suspect numbers. In the exemplary implementation, the sample period during the second stage procedure corresponds to the sample period of the first stage procedure.

At the end of the sample period, the suspect number, or numbers, that again meet the match criteria are now considered to be the offending numbers. That is, telephone numbers associated with called stations that are parties to a mass call event.

Notification of the identities is provided to the central management processor (shown in FIG. 2). The central management processor then distributes the offending number or numbers, as well as provisioned action to all of the application processors of the signaling transfer point. The application processors each then permit pass through of only a provisioned number of calls for each offending number, and the remainder of the calls are terminated with a release cause. By permitting some calls through for the offending number, the action prevents calls to the offending number from generating congestion at the destination. Class 4 switches, and others, also prevent the calls to the offending number to cause other revenue-generating calls to be lost due to congestion. The nominated application processor continues tier one and tier two detection operations while a mass call event is in effect. When the match criteria is no longer valid, the mass call event is considered to have ended, and the central management processor is notified. And, in turn, the central management processor sends a message to all of the other application processors to indicate that the mass call event has terminated.

FIG. 5 illustrates a method flow diagram, shown generally at 72, representative of operation of an embodiment of the present invention. The method facilitates amelioration of network congestion caused by a mass call event in a telephonic network in which a plurality of call connections are requested to be made to a selected set of called stations within a selected time period.

First, and as indicated by the block 74, occurrence of the mass call event is detected responsive to indications of selected attempts to form call connections between selected calling stations and selected called stations during operation of the telephonic network. Then, and as indicated by the block 76, network elements are notified of the mass call event responsive to detections of the mass call event. The notifications are made manually and free of manual interaction.

Thereby, a manner is provided by which automatically to detect and to initiate amelioration of congestion caused by a mass call event.

The previous descriptions are of preferred examples for implementing the invention, and the scope of the invention should not necessarily be limited by this description. The scope of the present invention is defined by the following claims:

The invention claimed is:

1. In a telecommunications network having network elements and through which call connections are formed between calling stations and called stations to permit telephonic communications to be effectuated, an improvement of apparatus for facilitating amelioration of network congestion caused by a mass call event in which a plurality of call connections are requested to be made to a selected set of called stations within a selected time period, said apparatus comprising:

a mass call event detector adapted automatically to receive indications of selected attempts to form call connections between selected calling stations and selected called stations during operation of the telecommunication network, said mass call event detector for detecting occurrence of the mass call event responsive to the indications of the selected attempts; and a notifier coupled to said mass call event detector to receive indications of detection of occurrence of the mass call event, said notifier for notifying the network elements of the mass call event, automatically and free of manual interaction;

wherein the mass call event detector and the notifier are a nominated one of a plurality of mass call event detectors and notifiers, and wherein the one nominated mass call event detector detects the occurrence of the mass call event and the one nominated notifier provides a notification of the occurrence received by each of the network elements.

2. The apparatus of claim 1 wherein the signal transfer point comprises an application processor and wherein said mass call event detector and said notifier are embodied at the application processor.

3. The apparatus of claim 1 wherein the called stations of the selected set with which the call connections are requested to be made each has associated therewith a telephonic identifier and wherein said notifier further notifies the network elements of the mass call event with the telephonic identifier of the called stations that form the selected set.

4. The apparatus of claim 1 wherein the network elements comprise at least one application processor and wherein said notifier notifies the at least one application processor of the mass call event.

5. The apparatus of claim 1 wherein said mass call detector detects occurrence of the mass call event when the indications of the selected attempts are beyond a selected threshold.

6. The apparatus of claim 5 wherein the selected threshold used by said mass call detector pursuant to detection of the occurrence of the mass call event comprises a selectable value.

7. The apparatus of claim 6 wherein the telecommunications network is operated by a network operator and wherein the selectable value that comprises the selected threshold is selected by the network operator.

8. The apparatus of claim 1 wherein the indications of the selected attempts to form the connections to which said mass call event detector is adapted to receive and responsive to which the occurrence of the mass call event is detected comprise derived parameters.

9. The apparatus of claim 8 wherein the derived parameters forming the indications of the selected attempts are derived from statistically-computed indicia of call connection attempts.

10. The apparatus of claim 1 wherein the attempts to form call connections include generation of IAM messages and wherein the indications of the selected attempts to form the call connections to which said mass call event detector is adapted to receive comprise selected ones of the IAM messages.

11. The apparatus of claim 10 wherein the IAM messages are generated by calling parties and include telephonic identifiers identifying called parties with which call connections are attempted by the calling parties, and wherein said mass call event detector maintains a first count of IAM messages containing selected telephonic identifiers.

12. The apparatus of claim 11 wherein said mass call event detector maintains the first count of the IAM messages during a first selected time period.

13. The apparatus of claim 12 wherein said mass call event detector maintains a subsequent count of IAM messages containing a subset of the selected telephone identifiers during a second time period, subsequent to the first time period.

14. The apparatus of claim 13 wherein said mass call detector detects the occurrence of the mass call events responsive to the subsequent count made during the second time period.

15. In a method of communicating in a telecommunications network having network elements and through which call connections are formed between calling stations and called stations to permit telephonic communications to be effectuated, an improvement of a method for facilitating amelioration of network congestion caused by a mass call event in which a plurality of call connections are requested to be made to a selected set of called stations within a selected time period, said method comprising:

detecting occurrence of the mass call event, by a mass call event detector, responsive to indications of selected attempts to form call connections between selected calling stations and selected called stations during operation of the telecommunication network;

notifying the network elements, by a notifier, of the mass call event responsive to detections made during said operation of detecting, notifications made automatically and free of manual interaction;

wherein the mass call event detector and the notifier are a nominated one of a plurality of mass call event detectors and notifiers;

detecting, by the one nominated mass call event detector, the occurrence of the mass call event; and providing, by the one nominated notifier, a notification of the occurrence received by each of the network elements.

16. The method of claim 15 wherein said operation of detecting comprises maintaining a count of call requests to call stations, the called stations identified by telephonic identifiers.

17. The method of claim 15 wherein the mass call event is detected during said operation of detecting when the indications of the selected attempts are beyond a selected threshold.

18. The method of claim 17 further comprising the operation, prior to said operation of detecting, of selecting the selected threshold.

19. The method of claim 15 wherein the indications responsive to which the mass call event is detected during said operation of detecting comprises derived values.

20. In a telecommunications network having network elements and through which call connections are formed between calling stations and called stations to permit telephonic communications to be effectuated, an improvement of apparatus for facilitating amelioration of network congestion caused by a mass call event in which a plurality of call connections are requested to be made to a selected set of called stations within a selected time period, said apparatus comprising:

a mass call event detector adapted automatically to receive indications of selected attempts to form call connections between selected calling stations and selected called stations during operation of the telecommunication network, said mass call event detector for detecting occurrence of the mass call event responsive to the indications of the selected attempts; and a notifier coupled to said mass call event detector to receive indications of detection of occurrence of the mass call event, said notifier for notifying the network elements of the mass call event, automatically and free of manual interaction;

wherein the mass call event detector and the notifier are at least one of a nominated one of a plurality of mass call event detectors and notifiers, and wherein the one nominated mass call event detector detects the occurrence of the mass call event and the one nominated notifier provides a notification of the occurrence received by each of the network elements.

21. In a method of communicating in a telecommunications network having network elements and through which call connections are formed between calling stations and called stations to permit telephonic communications to be effectuated, an improvement of a method for facilitating amelioration of network congestion caused by a mass call event in which a plurality of call connections are requested to be made to a selected set of called stations within a selected time period, said method comprising:

detecting occurrence of the mass call event, by a mass call event detector, responsive to indications of selected attempts to form call connections between selected calling stations and selected called stations during operation of the telecommunication network;

notifying the network elements, by a notifier, of the mass call event responsive to detections made during said operation of detecting, notifications made automatically and free of manual interaction;

wherein the mass call event detector and the notifier are at least one of a nominated one of a plurality of mass call event detectors and notifiers;

detecting, by the one nominated mass call event detector, the occurrence of the mass call event; and providing, by the one nominated notifier, a notification of the occurrence received by each of the network elements.

\* \* \* \* \*